United States Patent
Piepenbreier et al.

(10) Patent No.: US 12,503,429 B2
(45) Date of Patent: Dec. 23, 2025

(54) PROCESS FOR MANUFACTURING ALKANESULFONIC ACIDS

(71) Applicant: BASF SE, Ludwigshafen (DE)

(72) Inventors: Frank Piepenbreier, Ludwigshafen (DE); Andreas Kempter, Ludwigshafen (DE); Chee Jian Chan, Ludwigshafen (DE); Rosario Mazarro Berdonces, Ludwigshafen (DE); Kerstin Schierle-Arndt, Ludwigshafen (DE); Bjoern Kaibel, Ludwigshafen (DE); Jan Spielmann, Ludwigshafen (DE); Frieder Borgmeier, Ludwigshafen (DE); Michael Zeilinger, Ludwigshafen (DE); Ingo Biertuempel, Duisburg (DE); Timo Ott, Duisburg (DE)

(73) Assignee: BASF SE, Ludwigshafen am Rhein (DE)

( * ) Notice: Subject to any disclaimer, the term of this patent is extended or adjusted under 35 U.S.C. 154(b) by 848 days.

(21) Appl. No.: 17/766,035

(22) PCT Filed: Sep. 22, 2020

(86) PCT No.: PCT/EP2020/076350
§ 371 (c)(1),
(2) Date: Apr. 1, 2022

(87) PCT Pub. No.: WO2021/063730
PCT Pub. Date: Apr. 8, 2021

(65) Prior Publication Data
US 2022/0340518 A1   Oct. 27, 2022

(30) Foreign Application Priority Data
Oct. 1, 2019 (EP) ................................... 19200835

(51) Int. Cl.
*C07C 303/06* (2006.01)

(52) U.S. Cl.
CPC .................................. *C07C 303/06* (2013.01)

(58) Field of Classification Search
USPC ........................................................ 562/123
See application file for complete search history.

(56) References Cited

U.S. PATENT DOCUMENTS

| 7,282,603 B2 | 10/2007 | Richards |
| 2019/0276394 A1 | 9/2019 | Dubois |

FOREIGN PATENT DOCUMENTS

| WO | 2004/041399 A2 | 5/2004 |
| WO | 2015/071351 A1 | 5/2015 |
| WO | 2015/071365 A1 | 5/2015 |
| WO | 2015/071371 A1 | 5/2015 |
| WO | 2015/071455 A1 | 5/2015 |
| WO | 2018/096138 A1 | 5/2018 |
| WO | 2018/146153 A1 | 8/2018 |
| WO | 2018/208701 A1 | 11/2018 |
| WO | 2018/219726 A1 | 12/2018 |
| WO | 2018/219728 A1 | 12/2018 |
| WO | 2019/154681 A1 | 8/2019 |
| WO | 2021/023582 A1 | 2/2021 |

OTHER PUBLICATIONS

Díaz-Urrutia, et al., "Activation Of Methane To CH3+: A Selective Industrial Route To Methanesulfonic Acid", Science, vol. 363, Issue 6433, Mar. 22, 2019, pp. 1326-1329.
European Search Report for EP Patent Application No. 19200835.7, Issued on Mar. 16, 2020, 4 pages.
International Search Report for PCT Patent Application No. PCT/EP2020/076350, Issued on Nov. 27, 2020, 5 pages.
Kappenthuler, et al., "Environmental Assessment Of Alternative Methanesulfonic Acid Production Using Direct Activation Of Methane", Journal of Cleaner Production, vol. 202, Nov. 20, 2018, pp. 1179-1191.

*Primary Examiner* — Ana Z Muresan
(74) *Attorney, Agent, or Firm* — ArentFox Schiff LLP

(57) ABSTRACT

The present invention relates to an improved process for manufacturing of alkanesulfonic acids.

24 Claims, 1 Drawing Sheet

PROCESS FOR MANUFACTURING ALKANESULFONIC ACIDS

CROSS-REFERENCE TO RELATED APPLICATIONS

This application is a National Stage Entry of PCT/EP2020/076350, filed Sep. 22, 2020, which claims priority to EP Application Serial No. 19200835.7, filed Oct. 1, 2019, the disclosures of each of which are hereby incorporated by reference in their entirety.

The present invention relates to an improved process for manufacturing of alkansulfonic acids R—SO$_3$H (hereinafter "RSA"), wherein R stands for C$_1$-C$_4$alkyl such as methyl, ethyl, n-propyl, i-propyl, n-butyl, i-butyl, sec.-butyl or tert.-butyl, preferably for methyl, i.e. methanesulfonic acid (hereinafter "MSA") and to RSA, in particular MSA, manufactured by said process and its uses.

Alkanesulfonic acids are known to be strong organic acids with similar acid strength compared to inorganic mineral acids like e.g. sulfuric acid. As non-oxidizing and in the case of e.g. methanesulfonic acid (MSA), biodegradable acid, these acids, especially methanesulfonic acid, are used for a multiplicity of different processes, for example in electroplating industry, in chemical processes or in cleaning applications, or for example in semiconductor industry or as rust and scale remover.

WO 2004/041399 and U.S. Pat. No. 7,282,603 aim at the conversion of methane into methanol and other feed stock chemicals with MSA as an intermediate product formed in a radical reaction from SO$_3$ and methane. The patent describes in detail the formation of the radical initiator (Marshall's and Caro's acid) and possible reactor setups. The author claims that MSA is the solvent of the reaction. It is not mentioned that the formation of the described radical starters inevitably leads to the formation of sulfuric acid. Nor does it provide any information on the formation of waste streams in general. In addition, no detailed information about the recovery of MSA from the reaction mixture is given. According to the invertor himself, WO 2004/041399 relies on calculations, computer simulations and lab tests only and is not proven to be economically feasible (compare WO 2004/041399, page 31, lines 7-9). Consequently, additional know-how is required for the development of an economic process.

WO 2015/071351 describes a process for the formation of dialkylsulfonyl peroxide (DASP) from an alkansulfonic acid chloride and a peroxide. In addition, WO 2015/071371 describes the preparation of a DASP from alkanesulfonic acids by electrolysis. WO 2015/071365 claims a process for the synthesis of an alkanesulfonic acid from sulfur trioxide and the corresponding alkane with the help of a corresponding DASP as an initiator. According to the invention the synthesis process is performed at temperatures from 25° C. to 65° C. and pressures from 40 bar to 110 bar. No information about a reactor concept or a continuous production of alkanesulfonic acids is given. Nor is any indication given for a potential correlation between the mode of operation and the formation of any compounds which need to be removed from the process.

WO 2015/071455 describes a process in which an alkanesulfonic acid is formed from SO$_3$ and an alkane with help of an alklysulfonyl peroxide as an initiator. Furthermore, the recovery of methanesulfonic acid by means of distillation is described. According to the patent the bottom product of the distillation contains H$_2$SO$_4$ and up to 10 wt.-% alkane sulfonic acid. The bottom product of the distillation can be recycled to the reaction stage of the process. This stream can be used for the formation of the radical starter by the addition of H$_2$O$_2$ and similarly for the formation of fresh Oleum by the addition of pure SO$_3$ and as solvent for the reaction. However, it is not described whether SO$_3$ and H$_2$O$_2$ are added to this stream. No details about the operation of a continuous process are mentioned. WO 2015/071455 describes the use of the distillation bottoms 1) as solvent for the reaction or 2) to be loaded with SO3 to form "fresh" oleum or 3) to produce the initiator or a precursor of the initiator by addition of H2O2, but it gives no indication on any necessity to remove some portion of this stream from the system, or how to reduce its overall amount.

WO 2018/096138 claims a precursor and a process for the solvent free synthesis of MSA from pure SO$_3$ and methane. The application describes the preparation of an alkanesulfonic hydroperoxide, which is regarded is a precursor for the initiator, from an alkanesulfonic acid and hydrogen peroxide. The active initiator is then formed in the main reaction step with SO$_3$. Furthermore, it is described that SO$_3$ can be supplied as Oleum with SO$_3$ concentration of 50 wt.-% or less or 65 wt.-% or more. Additionally, it is stated that, if pure sulfur trioxide is used, the circulation of solvent can be omitted. It is mentioned that the resulting mixture of MSA and sulfuric acid can be purified by distillation, but no further details about a continuous process are given. The synthesis procedure described in here contains the filling of the reactor with SO3, pressurizing with methane and the dropwise addition of the initiator at the beginning of the reaction. This results in an initial pressure drop. Afterwards, the reactor is pressurized another two times with methane without any further addition of initiator. Consequently, the addition of the initiator was only performed once at the beginning of the reaction.

Additionally, when hydrogen peroxide (which is always provided as aqueous solution) is used in combination with SO3, inevitably sulfuric acid is formed by reaction of SO3 and water. Sulfuric acid has to be discarded from the process. The purge of H2SO4 always brings along a loss of product/alkanesulfonic acid as complete separation of sulfuric acid and alkanesulfonic acid even in the distillation bottoms would require tremendous technical and energetic efforts. For the design of an economic process it is therefore desirable to find an optimized mode of operation to minimize the formation of sulfuric acid.

WO2018/146153 relates to a production process for methanesulfonic acid from methane and SO$_3$, that involves the reaction with a carbocation. The carbocation is obtained with the help of a hydrogen peroxide derivative as an initiator precursor reacting with a super acid. According to the application the pre-catalyst may be added with an amount of 0.9 wt.-% related to SO$_3$. It is mentioned that sulfur trioxide can be either supplied in pure form or as oleum with a SO$_3$-concentration of 15-60 wt.-%. A scheme of the process for the reaction to MSA comprises a cascade of reactors and a distillation column for the recovery of MSA with high selectivity and yield. Here no waste stream leaving the process is indicated. All reactants (CH$_4$, SO$_3$, initiator precursor) and the solvent of the reaction (MSA, sulfuric acid) are fed to the first reactor of the cascade. No further process information is delivered, e.g. regarding reactor types.

WO2018/208701 aims at the recovery of MSA after it was formed in a radical reaction from methane and SO$_3$. The patent claims the processing of unconverted SO$_3$ with preferably water to form a heavy boiling compound like sulfuric acid after depressurization. It is mentioned that an excess of water may be advantageous to convert all $SO_3$. Furthermore, a distillation column for the purification is described. It is mentioned, that operating the distillation column at MSA rich conditions (feed contains >50 wt.-% MSA) may result in lower operating and invest costs compared to sulfuric acid rich conditions (feed contains >50 wt.-% $H_2SO_4$). Additionally, details about the column internals and the operating pressure are given. However, the patent contains no information about the separation of MSA from water, which was previously added in excess. Moreover, the conversion of SO3 by addition of water comes at the expense of forming unwanted sulfuric acid. MSA needs to be separated from sulfuric acid, e.g. in a distillation step. However, WO2018/208701 does not give any indication what to do with the increased amount of sulfuric acid, nor does it indicate any measures to counter the formation of additional sulfuric acid by other means, e.g. an optimized mode of operation of the process.

The publication by Kappenthuler et al. [*Journal of Cleaner Production*, 202, 2018, 1179-1191] evaluates the ecological impact of the production of MSA from $SO_3$ and methane compared to the oxidation of dimethyl disulfide. In this publication the authors assume a $SO_3$-conversion of about 88%. A mixture of MSA and leftover sulfur trioxide is feed to a purification section comprising quenching of $SO_3$ with water and distillation of the resulting MSA/$H_2SO_4$-solution. The operation conditions of the distillation are 200° C. and 10 mbar (assumed based on the physical properties). MSA with a purity of 99.5 wt.-% is obtained as distillate and the bottom product consists of an 80:20 mixture of MSA and sulfuric acid. It is shown that a fraction of the bottom product is recycled to the reaction, but this is not quantified. Although the publication mentions certain molecules as initiators, no information on the formation of the initiator in combination with the MSA synthesis is provided. Additionally, in order to minimize loss of reactants and product, a high SO3 conversion is desired.

WO 2018/219728 describes means to reduce the sulfuric acid content after the reaction of methane and SO3 to MSA. In the synthesis of the initiator aqueous hydrogen peroxide is used. Water reacts with sulfur trioxide to sulfuric acid. To avoid formation of sulfuric acid during starter synthesis, MSA anhydride is added as a water scavenger forming MSA upon reaction with water. Through this, raw materials losses in the overall process are reduced. Additionally, with a lower sulfuric acid content the effort for the purification of MSA can be minimized. However, the extra use of MSA anhydride requires additional effort for its provision and dosing. In order to reduce variable and fix costs it is desired to use the reactants, that are needed anyway, more effectively.

US 2019/276394 A1 discloses a process for the manufacturing of alkanesulfonic acids, which is characterized by a continuous mode of operation. It describes the addition of raw materials and preferred molecular ratios of the reactants. The initiator is provided to the reactor at the beginning of the reaction. Despite the fact that the initiator is as important for the process as SO3 and methane, no molar ratios—as absolute value or relative to the other raw materials—are given, nor are any measures provided for an effective use of the initiator. Moreover, no hints can be found that the authors see any correlation between starter on the one hand, and formation of sulfuric acid on the other hand, which needs to be purged from the process to avoid accumulation. A1 describes the manufacturing of alkanesulfonic acids from sulfur trioxide and an alkane, in which the alkane has a purity of 98 mol % or higher. Several options to carry out such a synthesis are given in the text and in the examples. All options describe the addition of an initiator solution to one reactor in one portion (batch operation) or continuously. There are neither hints on a potential correlation between initiator and waste stream, nor on the necessity to investigate WO 2019/154681 ways for a more efficient use of the initiator. In particular there are no hints that it may be advantageous to split the dosage of the initiator over several reactors.

Diaz-Urrutia et al., Science, 22 Mar. 2019, pp. 1326-1329 (including supplementary material) report on a scalable synthesis route for methanesulfonic acid based on methane and SO3 with the help of an electrophilic initiator. Both batch experiments in lab scale and conti experiments in pilot plant scale are presented. The reaction in the pilot plant is carried out in a cascade of reactors, all the reactants are fed to the first reactor. A strong focus of the paper is on the discussion of potential reaction mechanisms.

Several experimental data show correlations between reaction velocity or side product formation and e.g. the SO3 concentration, the stirring speed, or the absence/presence of deactivating agents like O2, SO2 or ethane. After depressurization the unconverted $SO_3$ is quenched with water in a glass reactor. From this unit constantly 5% of the volume are withdrawn as a purge stream. The mixture after the quench step contains a ratio of MSA/$H_2SO_4$ of about 40:60 and is transferred to a vacuum distillation column. The authors state, that MSA with a purity of 99.9% is recovered as the distillate, while a mixture of MSA/$H_2SO_4$ as a bottom product is recycled back to the reactor cascade completely up to 20 times. No waste stream is mentioned. Therefore, this publication provides no insights for measures reducing a waste stream.

Moreover it remains unclear if a more effective use of the initiator is possible. For example, no efforts were made on investigating the intrinsic performance of the initiator as such ("intrinsic" in the sense of "irrespective of the presence of deactivating agents, which represent impurities in the feed streams, just focusing on the key components SO3, solvent (mix of H2SO4 and MSA), methane and initiator").

The literature dealing with the manufacture of alkanesufonic acids from the respective alkane, particularly the manufacture of methanesulfonic acid from methane, provides a lot of information on how to carry out the synthesis in a reasonable way. For example the general process conditions, the starter for the reaction, ways to reduce the formation of sulfuric acid by addition of water scavenger molecules during starter synthesis, pre-treatment of the feed to the distillation by addition of e.g. water (at the expense of formation of an unwanted side product sulfuric acid) are described and impurities slowing down the reaction are identified. However, only very limited, scattered and unsystematic information can be found, which hints on potential correlations between process conditions and formation of process streams that need to be purged from the system in order to avoid accumulation of impurities and side products of the reaction. Thus, the processes described in the above publications show some disadvantages. For example, the yield may still be improved. Besides, there is still a relatively high amount of waste produced.

Thus, there still is a need to overcome or at least reduce the problems associated with the processes known in the art. It was the aim of this work to systematically investigate potential correlations between different modes to conduct the process and its implications on the need to purge a significant portion of the process stream or process streams from the system thus generating a potential waste stream and reducing the overall yield of the process.

Surprisingly, an improved process to manufacture alkanesulfonic acids has now been found, in which a high MSA-yield referring to SO3 is achieved, and which allows to reduce the amount of waste without adding new compounds to the system like e.g. scavengers for water, and also avoiding purification steps for the raw materials prior to the reaction to reduce impurities which negatively impact the reaction, particularly slowing down the reaction or quenching it completely, like SO2, ethane etc.

As the most important of the short chain alkanesulfonic acids is methanesulfonic acid, the description in the following often refers to methanesulfonic acid in an exemplary manner. The inventive improved process as described herein can, however, also be applied to the manufacture of higher alkanesulfonic acids, the alkyl group having 1 to 4 C-atoms, as well.

This invention relates to an improved process for the continuous production of methanesulfonic acid by the reaction of sulfur trioxide and methane with the help of a peroxide initiator, which is prepared with an aqueous hydrogen peroxide solution. The process is characterized in that a high MSA-yield referring to SO3 is achieved and the amount of waste is reduced. The inventive procedure is based on dividing the addition of the initiator on several reactors of a cascade of reactors. If this had no impact on the reaction one could expect e.g. the same yield and the same amount of material to be purged from the system being formed. It has been shown that dividing the addition of the starter into several portions surprisingly has a beneficial effect on the process as e.g. the yield increases and the amount of material to be purged from the system decreases.

An object of the present invention is a process for the production of alkane sulfonic acid by the reaction of sulfur trioxide and alkane with the help of a starter and/or starter precursor, wherein the addition of the starter and/or starter precursor to the reactor or the reactor cascade is split.

In the context of the inventive process, "split" means to divide the addition of the overall starter amount over several addition points in the system, rather than stopping and restarting the addition of starter limited to one single addition point, e.g. one reactor.

Another object of the present invention is a process for the production of alkane sulfonic acid by the reaction of sulfur trioxide and alkane with the help of a starter, selected from the group consisting of inorganic peroxoacids, salts of inorganic peroxoacids, organic peroxoacids, salts of organic peroxoacids, hydrogen peroxide and mixtures thereof, and/or starter precursor, selected from the group consisting of sulfuric acid, oleum, SO3, alkanesulfonic acid, the bottom recycle stream from alkanesulfonic acid distillation, inorganic oxoacids, salts of inorganic oxoacids, hydrogen peroxide and mixtures thereof, wherein the addition of the starter and/or starter precursor to the reactor or the reactor cascade is split, wherein the synthesis is realized as batch process in a reactor cascade and the starter or starter precursor is divided.

The addition of the overall starter amount is realized over several addition points in the system, e.g. addition over several addition points to the first reactor and to further reactors of the cascade, or wherein the synthesis is realized as continuous process and the starter or starter precursor is divided and the addition of the overall starter amount is realized continuously over several addition points in the system to the first reactor and to further reactors of the cascade.

Another object of the present invention is also an alkane sulfonic acid, preferably methanesulfonic acid, obtainable by the inventive process.

Figure 1:
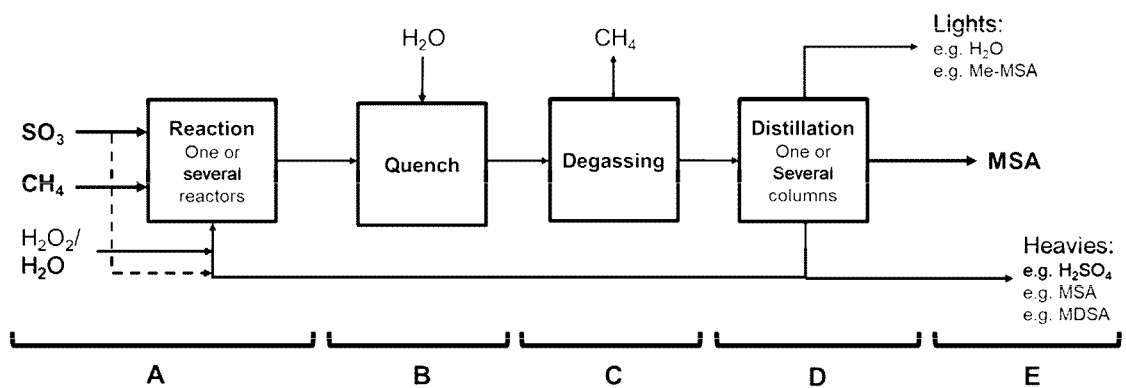
FIG. 1 shows one example how a process for the production of MSA by reaction of methane and sulfur trioxide can be set up and will be explained below in an exemplary manner.

A Reaction: Methanesulfonic acid (MSA) is formed from methane and $SO_3$ with a mixture of MSA and sulfuric acid as a solvent.

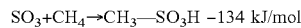

The reaction usually takes place at pressures from 10 to 200 bar and temperatures ranging from 25 to 100° C. In a preferred mode, the pressure is between 30 to 150 bar, more preferred between 50 and 110 bar, most preferred between 70 and 100 bar. In a preferred mode of operation, the temperature is between 40 to 80° C., more preferred between 45° C. and 65° C. The reaction is triggered with the help of an initiator (also called starter in the following), which is formed with the help of a peroxide, e.g. hydrogen peroxide. For the formation of the starter, hydrogen peroxide can be directly dosed into the reactor. In another option, the starter can be synthesized in a separate unit. In another embodiment, it is preferred to form the starter by reaction of the recycle stream and hydrogen peroxide as described below in step D→A.

The raw materials methane, SO3 and H2O2, and the solvent containing sulfuric acid and/or MSA are typically provided in the feed in a molar ratio of methane/SO3 between 0.50 to 2.0 mol/mol, preferred between 0.75 to 1.2 mol/mol. The ratio of H2O2/SO3 is typically in the range between 0.001 to 0.20 mol/mol, preferred between 0.01 to 0.10. The molar ratio between SO3 and MSA in the feed to the reactor system is typically set between 0.1 to 100 mol/mol, preferred 1 to 80 mol/mol, more preferred between 5.0 to 65.0 mol/mol. In a normal and stable mode of operation these ratios are kept constant by adequately dosing fresh feed components. The absolute amount of SO3 in the feed stream is between 20% and 85 wt %, preferably 40% to 75 wt %, more preferably between 60 and 75 wt %.

The liquid phase in the reactors is usually transferred to the next process step B. The reaction mixture leaving step A consists mainly of MSA, $H_2SO_4$ and unconverted reactants ($SO_3$ and methane). Apart from that, the solution leaving the reactors in most cases contains side products of the reaction, like methanesulfonic acid anhydride (MSA-anhydride), methanesulfonic methylester (Me-MSA), Methyl bisulfate (MBS) or methyldisulfonic acid (MDSA).

B Quench: The remaining $SO_3$ and MSA-anhydride can be converted with water to $H_2SO_4$ and MSA, respectively, either when the reaction mixture is still under $CH_4$ pressure (above ambient pressure) or when the reaction solution is already decompressed (ambient pressure or below). If conversion of $SO_3$ is close to 100%, e.g. between 95 and 100%, and the combined selectivity towards MSA and optionally MSAA is close to 100%, e.g. 90 to 100%, it is one option within the scope of the present invention that the reaction mixture might be processed further without step B. However, it is preferred to include step B in the process even if SO3 conversion and the selectivity to MSA and optionally MSAA are high.

C Degassing/Decompression: By reducing the pressure in step C a light boiling stream consisting mainly of methane and a heavy stream consisting of mainly MSA and sulfuric acid is formed.

D MSA purification: The feed to the purification contains mainly MSA and sulfuric acid. Additionally, water, unreacted raw material and reaction side products can be present. MSA can be recovered by distillation. Depending on the exact composition of the feed stream entering step D and the distillation concept, purified MSA is obtained from side-discharge (WO2018/219726) or from the bottom of a distillation column (unpublished patent application EP 19190621.3, i. e. BASF internal reference: 191048EP01). The bottom residue of such a distillation mainly consists of MSA and sulfuric acid. Typically, this stream is rich of sulfuric acid and still contains 10 to 30 wt.-% MSA. In general, all distillation columns are operated under reduced pressure in the range of from 0.1 to 50 mbar, preferably 2 to 30 mbar, more preferably 3 to 20 mbar and most preferably 5 to 15 mbar (all values given as absolute pressure at the heads of the columns and evaporators). Both bottom temperatures of the distillation columns and residence times in the bottom section of the distillation (i.e. the volume in the sump of the columns including heat exchangers, pumps, piping etc.) should be kept as low as possible to avoid decomposition of MSA. For this reason, the bottom temperatures are controlled to be typically between 140° C. and 220° C., preferably between 150 and 210° C., more preferably between 160° C. and 200° C. and most preferably between 165 and 195° C. or 170 and 190° C.

D→A Solvent Recirculation: One fraction of the residue from the MSA purification can be recirculated to step A as solvent for the reaction. $H_2O_2$ can be added to this stream or to a part of this stream to obtain fresh initiator. In one mode of operation, this recirculated stream is cooled. In another mode of operation, $H_2O_2$ is added to the cooled recirculated stream or a part of it under intensive mixing and cooling. Moreover, $SO_3$ can be added to this stream or to a part of this stream to load the reactor(s) with reactant and solvent, respectively. In another mode of operation, $SO_3$ is added to the cooled recirculated stream or a part of it with $H_2O_2$ under intensive mixing and cooling. Alternatively, $H_2O_2$ and $SO_3$ can be added simultaneously to the pre-cooled recirculated stream or to a part of it under intensive mixing and cooling. In another embodiment, $SO_3$ and/or $H_2O_2$ can directly be added into one or several of the reaction vessels of Step A.

E Waste stream: Sulfuric acid is formed in the process, especially in step B, and undesired accumulation of sulfuric acid in the recirculated stream must be prevented. Therefore, the other fraction of the purification residue needs to be removed from the process and e.g. be discarded as a waste stream (also called "purge"). For an economic operation the purge stream should be kept to a minimum.

Thus, the inventive process may comprise, in a preferred embodiment, the formation of methanesulfonic acid (MSA) from methane and $SO_3$ with a mixture of MSA and sulfuric acid as a solvent at a pressure from 10 to 200 bar and a temperature ranging from 25 to 100° C. (step A), preferably conversion of remaining $SO_3$ and MSA-anhydride to $H_2SO_4$ and MSA with water (step B), reduction of pressure (step C), recovery of MSA by distillation (step D), recirculation of one fraction of the residue from the MSA purification to step A as solvent for the reaction (step D), and discarding of the other fraction of the purification residue as a waste stream (step E), wherein, preferably, the addition of the starter or starter precursor, as defined below, to the reactor or the reactor cascade is split into two or more portions.

In one embodiment of the invention a high MSA-yield referring to SO3 is achieved by dividing the addition of the starter or starter precursor to the reactor or the reactor cascade into two or more portions. When setting up the synthesis as batch synthesis the starter or starter precursor can be added to the same reactor in several portions rather than adding the total amount at the very beginning of the synthesis in only one portion. Alternatively, when the batch synthesis is realized in a reactor cascade, the starter or starter precursor can be added in portions to the first reactor and/or to further reactors of the cascade. When setting up the synthesis as continuous process the starter or starter precursor can be divided and added continuously to the first reactor and to further reactors of the cascade at the same time. A continuous synthesis set-up with the amount of starter being divided and added continuously to the first and at least one more reactor of the cascade at the same time is preferred. The starter is typically provided in a solvent. It is preferred that the solvent contains sulfuric acid and/or methanesulfonic acid.

In one embodiment the division of the starter (total: x mol) over the n reactors of the reactor cascade can be varied in a wide window. For example, it can be continuously divided over the n reactors in a homogenous manner, meaning that each of the n reactors is supplied with a continuous fraction of x/n mol of the starter. Alternatively, the largest amount can be fed continuously into the first reactor of the cascade, e.g. 50% or 60% or 70% or 80% or even 90% and more of the x mol starter, while the remaining starter is divided over the remaining reactors of the cascade, either evenly or in different ratios per reactor. In another embodiment the largest amount of the starter is added to the first reactor while all the rest is fed into the second reactor of the cascade. In another embodiment the largest amount of the starter is added to the first reactor while all the rest is fed into the next reactors of the cascade.

While all these options are feasible and help to improve $SO_3$ conversion to MSA, it is preferred to add a significant part of the starter to the first reactor, e.g. between 30% and 98%, and all the remaining starter to the last reactor to push $SO_3$ conversion where $SO_3$ concentration is low and reaction rates therefore decrease. In another preferred mode the total amount of starter x is divided evenly between the n reactors.

In one preferred embodiment the division of the starter (total: x mol) over the n reactors of the reactor cascade is divided only in the first n−1 reactors, while no starter is added into the last reactor of the cascade. This has the advantage, that the total amount of starter at the outlet of reactor n is further reduced and no or less decomposition of unreacted starter is expected to take place in the following reaction and work up sections. As decomposition of starter might cause gas formation, this mode of operation with prevention of further starter decomposition is beneficial for the following process steps.

By dividing the starter dosage between the n reactors the effectivity of the starter is optimized, translating into higher SO3 conversion and finally MSA synthesis. This also means that the total amount of starter x, which is required when dividing the starter dosage as described above, is the same or even lower compared to a set-up where the total starter volume y is added to the first reactor, i.e. n*x/n=x=y or n*x/n=x<y.

Our investigations have furthermore shown that the starter and the precursor of the starter—be it a single compound or a mixture of different compound in solution, e.g. in sulfuric acid or MSA/sulfuric acid—may start decomposing at temperatures as applied during the reaction of methane and $SO_3$, typically e.g. 50° C. Therefore, the cooling steps described in the following help to suppress decomposition of the starter or starter precursor, thus foster the selective conversion of $SO_3$ to MSA and finally result in higher MSA yields.

Therefore, in a preferred embodiment of the invention a high MSA-yield referring to $SO_3$ is achieved by cooling the recycle stream leaving the distillation as a bottom residue prior to mixing it with the starter solution or the starter precursor solution or prior to feeding it to the reactor.

The starter precursor can be selected from sulfuric acid, oleum, SO3, methanesulfonic acid, the bottom recycle stream from MSA distillation and mixtures thereof. Further starter precursors may be inorganic oxoacids or salts thereof, e.g. oxoacids of boron, silicon, phosphorus, carbon, nitrogen or sulfur. Yet another group of precursors can be selected from organic oxoacids. The compounds can be used in pure form or in a solvent, especially a solvent comprising sulfuric acid and/or oleum and/or methanesulfonic acid. The starter itself is generated from this starter precursor or starter precursor solution by addition of hydrogen peroxide under intense mixing and cooling.

The starters may be selected from inorganic or organic peroxoacids or salts thereof, as e.g. a peroxosulfuric acid comprising at least one peroxosulfuric acid of boron, silicon, phosphorus, carbon, nitrogen or sulfur. Consequently, typical starters may be Caro's acid, Marshall's acid, dimethylsulfonylperoxide, monomethylsulfonylperoxide etc.

The recycle stream leaving the distillation as a bottom residue typically has a temperature between 140° C. and 220° C. The reactor cascade is typically operated between 25° C. to 100° C. In one embodiment of the invention the recycle is added to the reactors without further cooling.

In one option, the recycle stream is cooled to temperatures <25° C., preferred <20° C., more preferred <15° C., and most preferred <10° C. or even <5° C. or <0° C. and then the complete recycle stream is used for the preparation of the starter.

In another embodiment of the invention, preferably not the whole recirculated stream is used for the preparation of the starter, but a fraction of it, e.g. less than 50% of the recirculated stream, preferred less than 30% of the recirculated stream, more preferred less than 20% of the recirculated stream. In this case, the complete recycle stream is first cooled to the reaction temperature, e.g. 50° C., or it can be cooled to a temperature range close to the reaction temperature, e.g. 50° C. above or below the reaction temperature, preferably 20° C. above or below the reaction temperature, more preferably 5° C. above or below the reaction temperature and most preferably to 1° C. above or below the reaction temperature. It is preferred to cool down the complete recycle stream to reaction temperature or slightly below reaction temperature. Then, the fraction of the recycle stream, that is not used for preparation of the initiator is directly dosed to the reaction in step A as solvent. The fraction used for the preparation of the initiator is further cooled to temperatures <50° C., preferred <25° C., and most preferred <10° C. or even <5° C. or <0° C. or <−5° C.

In another embodiment of the invention a high MSA-yield referring to $SO_3$ is achieved by cooling the starter solution or starter precursor solution while mixing it with the recycle stream rather than adding the starter or starter precursor into the reactor and cooling the whole reaction mixture. Mixing of the recycle stream leaving the distillation as a bottom residue, preferred pre-cooled as described above, with hydrogen peroxide, the starter solution or the starter precursor solution, is done under intense mixing and cooling. Mixing can be done in a pipeline, in a static mixer, in a stirred or a not stirred reactor, in a vessel with injector nozzle or jet nozzle, in a heat exchanger or other devices suitable for mixing. In a preferred mode the mixing of the two streams is carried out in a static mixture with cooling function included or in a static mixer where a heat exchanger immediately follows the static mixer.

Preferably, the starter solution or starter precursor solution itself is cooled in a first step, and then it is mixed under further cooling with the pre-cooled recycle stream leaving the distillation as a bottom residue. These process steps are preferably performed at temperatures <50° C., preferred <25° C., and most preferred <10° C. or even <5° C. or <0° C. or <−5° C.

Of all the measures to increase $SO_3$ conversion to MSA given above, executing just one already has a beneficial effect and increases $SO_3$ conversion and thus also MSA yield. But as a matter of fact, executing several of the measures in combination will improve $SO_3$ conversion to MSA even more, and ideally all of the measures given above are realized in the process set-up as this will have the maximum effect to increase SO3 conversion translating into increased MSA yield.

This invention is, in a preferred embodiment, related to the production of methanesulfonic acid form methane and SO3. However, the aspects of this invention can also be applied for the sulfonation of other alkanes than methane to produce the respective alkanesulfonic acid.

One further target of the present invention is the reduction of costs for waste disposal. Therefore, the amount of waste generated in step E must be reduced. As described above, the size of this stream is related to the formation of sulfuric acid in steps A and B. The amount of sulfuric acid generated in step A is determined mainly by the amount of starter solution, more specific by the amount of water introduced in step A when aqueous $H_2O_2$ is added to produce the starter or the starter precursor solution. Free water introduced via $H_2O_2$ solution reacts with $SO_3$, reduces the MSA yield referring to $SO_3$ and increases the amount of sulfuric acid which accumulates in the process and needs to be purged. The amount of sulfuric acid generated in step B is determined mainly by the amount of unconverted $SO_3$ leaving reaction in step A. Consequently, to reduce waste cost, a high $SO_3$ conversion to MSA in Steps A and B is required.

In the prior art, the formation of MSA in a cascade of reactors is proposed and all reactants including the initiator are added to the first reactor. The conversion of SO3 to MSA in the reactor(s) is determined inter alia—as one out of several parameters—by the concentration of methane in the synthesis mixture. One option is to add methane just to the first reactor. In a continuously operated cascade of reactors this implies that the pressure slightly decreases from one reactor to the following. Especially if the starting pressure is high as described above, e.g. 100 bar, the pressure remains on a fairly high level all through the reactors. Typical pressure drops may be e.g. up to 5 bar per reactor, preferably up to 2 bar per reactor, more preferably up to 1 bar per reactor or even less, e.g. about 0.5 bar or 0.1 bar per reactor of the cascade. In one embodiment of the invention, methane is not added just to the first reactor but also to further reactors or reaction chambers of the cascade.

In one embodiment of this invention, the methane pressure is adjusted reactor by reactor, e.g. by continuously increasing the methane pressure from the first to the last reactor in a reactor cascade via individual methane supply pipelines for each reactor. It needs to be mentioned that, according to a preferred embodiment of this invention, in a continuous and stable mode of operation of the inventive process the one pressure level or the different pressure levels of the reactors of a reactor cascade are always kept constant, e.g. by using pressure control valves in the methane feed lines to the reactor(s). Alternatively, methane can be fed at the same pressure into the first reactor(s) of a cascade, whereas the last reactor is constantly operated at a higher methane pressure than the first reactor(s) of the cascade, e.g. higher by up to 5 bar or up to 10 bar or even up to 20 bar. All reactors operated at the same pressure can be connected via pipeline at the gas phase of each reactor to ensure supply of methane to each reactor. Alternatively, the reactors can be equipped with an overflow pipe. In this kind of setup, a gas/liquid mixture containing methane is transported from one reactor to another. Yet another option is to reduce the methane pressure from the first to the last reactor in a reactor cascade via individual methane supply pipelines with pressure control for each reactor. It is preferred to keep the pressure over of the cascade constant, i.e. the pressure difference between first and last reactor is no more than 5 bar, preferably no more than 2 bar, more preferably no more than 1 bar or even less, e.g. no more than 0.5 bar or 0.1 bar.

To enable a high mass transfer rate of methane from the gas to the liquid phase, a high surface area at the gas-liquid boundary must be provided. This can either be achieved by use of a stirrer. Alternatively, one or more dip tubes, nozzles, ejector nozzles, frits, sieve trays, or ring spargers can be used as gas distributor. As reactors one or more stirred tank reactors, bubble column reactors, gas circulation reactors, air lift reactors, jet loop reactors, falling film reactors, tubular reactors and water-ring pumps can be used. Stirrers, nozzles, and gas distributors can also be used in combination. Another option to provide a high mass transfer rate is the use of filling material or reactor internals with a high surface area like glass balls, random column packings (e.g. Raschig rings) or structured packings (e.g. packings provided by Sulzer, Montz, Koch-Glitsch or others). The alkane, preferably methane, is introduced into the reactor at a specific height, which can be above the surface of the liquid or underneath the surface of the liquid. If the gas is introduced underneath the surface this can be done in different manners, e.g. by dip tube, by distributor, by nozzle, by jet nozzle, by perforated plate or other means suitable to introduce gas into a liquid, or a combination thereof. It is preferred to introduce the alkane, e.g. methane, underneath the surface of the liquid.

In one embodiment of the reaction the reactor cascade can comprise different types of reactors, e.g. a combination of a loop reactor or set of loop reactors and a stirred tank reactor or set of stirred tank reactors. The reactors can be aligned as series, in parallel or in a combination of parallel and serially aligned reactors. It is beneficial to provide a high gas-to-liquid mass transfer rate at the beginning of the reactor cascade, when the rate of the reaction is high. After the first reactor(s) providing a high gas-to-liquid mass transfer rate, it may be sufficient that further reactors provide a lower mass transfer rate. Technically, this can be realized by combining e.g. stirred tank reactor(s) with bubble column reactor(s) or jet loop reactor(s) with an air lift reactor(s). Irrespective of the combination of different types of reactors the addition of the initiator can be split over two or more reactors of the cascade of the reactors.

Dosing all SO3 into the first reactor of a cascade, directly or after pre-mixing, total or partial, e.g. with the recycle stream leaving the distillation as a bottom residue, is preferred. However, there may be reasons which also dictate to divide the dosing of the raw material SO3 into several reactors of the cascade rather than adding the total amount to the first reactor, irrespective if the reaction is set up as batch process or as continuous process. Such reasons may be a limited solubility of SO3 in the recycle stream, or the need to reduce the heat of mixing when adding SO3 to the recirculated stream, or vice versa, per piece of equipment. As for the starter and for methane, the addition of SO3 may then be divided between the first reactor(s) of the cascade. SO3 should not be added to the last reactor of the cascade as chances to convert the largest amount of SO3 before it leaves the reactor towards quench and distillation are minimal.

Figure 2:
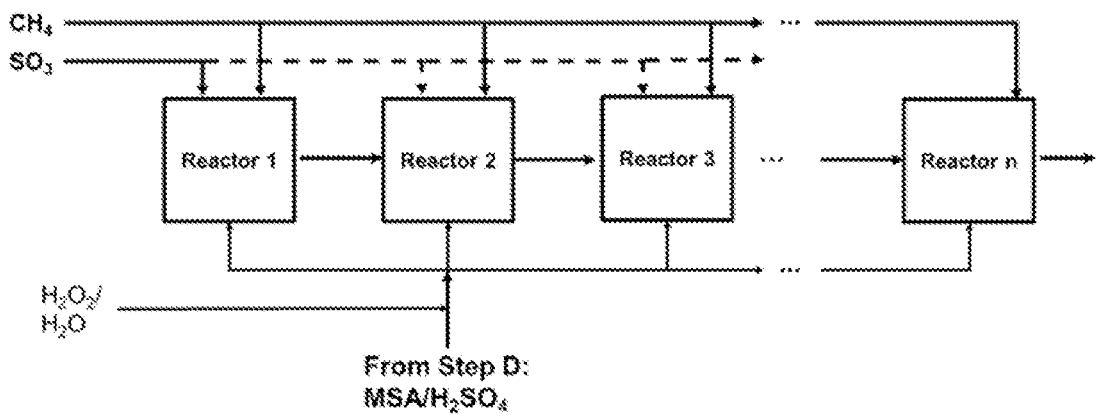
FIG. 2 shows an exemplary reactor set up for an embodiment of the inventive process.

If the initiators are only added to the first reactor as described in the prior art, $SO_3$-conversion and consequently MSA yield achieved over the reactor cascade is lower than in the inventive process when the dosing of the initiator is split. An example of a reactor cascade with the supply of reactants and initiator according to one embodiment of the present invention is depicted in FIG. 2 (and described below).

Especially in a continuous process set-up the amount of water required in the quench (step B) to convert SO3 to sulfuric acid and to hydrolyse MSAA to MSA, can be calculated based e.g. on the mass flow leaving the reactor or entering the quench assuming a constant percentage of SO3 and MSAA to be treated. Alternatively, the amount of water can be calculated relative to the mass flow of raw materials, e.g. SO3 or methane or the recycle stream, being added to the reactor cascade. In this case water is added in step B with a constant mass flow in a fixed ratio to the mass flow of e.g. one of the raw materials or the product stream leaving the reactor cascade as listed above. It is easy for a person skilled in the art to establish a similar control based on fixed ratios for a process operated in batch mode, e.g. adding water in a fixed ratio to one of the raw materials in combination with the reaction time.

However, in a preferred mode to better control the feed to the distillation and the discharge of a waste stream in step E according to the conversion of SO3 in steps A and B, accurate process analytics is helpful. The generation of MSA and the conversion of SO3 can be measured with a density measurement, e.g. in step B. As the density of pure MSA is lower than the density of Oleum (H2SO4+SO3), an increasing conversion can be monitored by a decreasing density. In step B, the addition of water can be controlled with the help of a conductivity measurement. The conductivity rises proportional to the water content of the solution. To avoid the formation of side products in step D, it is crucial to remove SO3 completely. For this reason, equimolar amounts of water relative to SO3 and MSAA or an excess of water is beneficial. However, if too much water is added the purification effort in step D would increase. Furthermore, the ratio of MSA to sulfuric acid can be checked with a density measurement in the feed to step D. As an alternative to conductivity measurements, sound velocity measurements can be used. Side products of the reaction, e.g. methanesulfonic acid anhydride (MSAA), can be identified using an online spectroscopic method like RAMAN-, IR- or NMR-spectroscopy. As MSAA can be hydrolyzed in Step B, the information gathered with spectroscopic methods can also be used to adjust the water addition in this step. Preferably, RAMAN-spectroscopy is used. As an alternative, chromatographic methods can be employed. When applying the suitable analytic method the mass flow rate of the purge stream in step E can be adjusted according to the amount of unconverted SO3 and the amount of sulfuric acid formed during the synthesis of the initiator and consequently can be minimized.

All analytic methods can be applied as offline measurement, e.g. for measurements on a daily, weekly or monthly basis, or as inline measurement for continuous surveillance of the respective parameters A high conversion of $SO_3$ in step A or in other words a reduced formation of sulfuric acid further helps to minimize the concentration of sulfuric acid in the distillation in step D.

It is advantageous, to feed MSA with a concentration between 50 to 99 wt.-%, preferred 60 to 90 wt.-%, more preferred 65 to 85 wt.-%, into the distillation to keep the distillation set-up simple and the energy demand to operate the distillation low. This implies that the feed to the reaction has a SO3 content of 30 to 99 wt.-%, preferred 50 to 99 wt.-%, more preferred 60 to 90 wt.-%, and most preferred 60 to 80 wt.-%.

For the general understanding of this invention it needs to be mentioned that according to the inventive process the process parameters at stable operation, be it in continuous or in batch mode of operation, especially in continuous mode of operation, are preferably kept constant, i.e. at or close to a target value, e.g. regarding temperature level(s), pressure level(s), feed ratios, liquid level(s) etc., as it is common practice in chemical processes, e.g. by applying temperature control systems, pressure control systems, mass flow and/or volume flow systems, these systems normally consisting of a sensor or a set of sensors and the respective actor or set of actors.

To illustrate some aspects of the present invention, several experimental examples may be found below.

EXAMPLES

Comparative Example 1

The synthesis of MSA from SO3 and methane (process step A) is carried out in a cascade of three reactors in continuous operation. Each of these stainless steel reactors has a volume of 18l and is equipped with stirrer, thermo element, pressure indicator, cooling coils and a blow-out disc. Prior to use the reactors are inerted by rinsing with nitrogen for 5 min. For the start-up of the reactors, the first reactor is filled with a mixture of H2SO4 and MSA (mass ratio 12.5:1) until the stirrer is covered and the temperature is set to 50° C. Methane is provided to each reactor at a pressure of 90 bar and the feed supply is started. The reactors of the cascade are successively filled with the fresh reaction mixture until a stationary operation point is reached. The initiator is produced by adding $H_2O_2$ 60% to the MSA/H2SO4-mixture recycled from the bottom of the distillation under constant cooling at −5° C. The amount of initiator solution added constantly to the reaction mixture is such that the $H_2O_2$ concentration in the whole feed mixture is about 1 wt.-%. The total liquid feed to the first reactor ($SO_3$, MSA, $H_2SO_4$, $H_2O_2$) has a mass flow rate of about 2.5 kg/h with a concentration of fresh $SO_3$ of 65 wt.-%, the rest being a mixture of MSA (3 wt.-%), sulfuric acid (31 wt.-%), initiator solution and small amounts of side products from the recycle of the bottom of the distillation column (<<1 wt.-%, e.g. MDSA). When the reactors are at a stationary operation point, the concentrations of the main components in the reactor outlets are as follows:

| Concentration/wt.-% | Reactor 1 | Reactor 2 | Reactor 3 |
|---|---|---|---|
| MSA | 45 | 52 | 57 |
| $SO_3$ | 18 | 11 | 8 |
| $H_2SO_4$ | 37 | 37 | 35 |

Samples from each reactor are taken and analyzed by 1H NMR, ion chromatography and titration. The MSA-concentration after the last reactor is determined by density measurement to be 57 wt.-%. The SO3 content cannot be determined by direct measurement. It was calculated by a component balance considering the compositions of the reactor feed and the reactor outlet and the MSA concentrations in each reactor. The MSA concentration comprises MSA and MSA anhydride. MSA anhydride is completely hydrolyzed to MSA in the quench step. A $SO_3$ conversion of 86% and a yield with regard to SO3 of 74% were reached.

If these results are scaled to a production process with a capacity of 10 kt/a MSA 100% (8000 operating hours per year) the purge stream in process step E has a mass flow rate of 880 kg/h under the assumption that the purge stream still contains 30 wt.-% MSA.

Example 1

The reactor cascade of example 1 is prepared and operated in the same manner as in comparative example 1, i.e. at the same temperature, pressure and with the same feed rate and feed composition as in comparative example 1. In contrast to comparative example 1, the initiator is not only added to the first reactor, but also to the second reactor of the cascade. The split between initiator added to reactor one and two of the cascade is 2 (reactor 1): 1 (reactor 2). When the reactors are at a stationary operation point, the concentrations of the main components in the reactor outlets are as follows:

| Concentration/wt.-% | Reactor 1 | Reactor 2 | Reactor 3 |
|---|---|---|---|
| MSA | 45 | 59 | 62 |
| $SO_3$ | 18 | 5 | 3 |
| $H_2SO_4$ | 37 | 36 | 35 |

Samples from each reactor are taken for analysis (1H NMR, ion chromatography and titration) and the MSA-concentration after the last reactor is determined by density measurement to be 62 wt.-%. The SO3 content cannot be determined by direct measurement. It was calculated by a component balance considering the compositions of the reactor feed and the reactor outlet and the MSA concentrations in each reactor. The MSA concentration comprises MSA and MSA anhydride. MSA anhydride is completely hydrolyzed to MSA in the quench step. Due to the split of the starter a $SO_3$ conversion of 95% and yield with regard to $SO_3$ of 85% were reached.

If these results are scaled to a production process with a capacity of 10 kt/a MSA 100% (8000 operating hours per year) the purge stream in process step E has a mass flow rate of 596 kg/h under the assumption that the purge stream still contains 30 wt.-% MSA.

This example highlights that the measures claimed in this application lead to a massive reduction of waste.

Example 2

Hydrogen peroxide was added to Oleum 32 under cooling to 0° C. to yield an initiator solution with a concentration of 0.7 wt.-% hydrogen peroxide. The peroxide concentration was confirmed by titration. The degradation of the peroxide at several temperatures is compared with the time $t_{1/2}$, in which half of the peroxide was decomposed. The results are shown in Table 1. The decomposition rate of the initiator shows a strong dependency on the temperature and quickly increases with increasing temperature. This example illustrates the advantage of cooling the recirculated stream from step D to step A for the formation of the initiator to ensure, that the required amount of initiator reaches the reactor.

TABLE 1

Decomposition of the initiator at different temperatures characterized by the time $t_{1/2}$, in which half the peroxide was decomposed.

| T/° C. | $t_{1/2}$/min |
| --- | --- |
| 40 | 1497 |
| 50 | 216 |
| 60 | 58 |

These results are surprising since industrially available peroxides, for example hydrogen peroxide, are expected to be stable also at elevated temperatures, for example at 50° C. Technical Data Sheet of hydrogen peroxide Interox® Technical Grade 50%, downloaded from Solvay homepage in July 2020, mentions a stability of 98%. This stability is based on gasometric stability measurements of hydrogen peroxide by Solvay performed at 100° C. (taken from the Technical Data Sheet downloaded from Solvay homepage in July 2020).

The experimental examples in general show a higher yield of the inventive process. Furthermore, the amount of waste stream could be reduced. These technical advantages could be obtained without any further reactor equipment, but only with an optimized reaction management.

The invention claimed is:

1. A process for the production of alkane sulfonic acid comprising reacting sulfur trioxide and an alkane with a starter and/or starter precursor in a reactor cascade,
   wherein the starter is selected from the group consisting of inorganic peroxoacids, salts of inorganic peroxoacids, organic peroxoacids, salts of organic peroxoacids, hydrogen peroxide, and mixtures thereof, and/or wherein the starter precursor is selected from the group consisting of sulfuric acid, oleum, SO3, alkanesulfonic acid, a bottom recycle stream from alkanesulfonic acid distillation, inorganic oxoacids, salts of inorganic oxoacids, hydrogen peroxide, and mixtures thereof,
   wherein reacting the sulfur trioxide and the alkane with the starter and/or starter precursor is a batch process and includes dividing the starter and/or starter precursor and adding the starter and/or starter precursor in portions to a first reactor and to further reactors of the reactor cascade, or wherein reacting the sulfur trioxide and the alkane with the starter and/or starter precursor is a continuous process and includes dividing the starter and/or starter precursor and adding the starter and/or starter precursor continuously to the first reactor and to further reactors of the reactor cascade.

2. The process according to claim 1, wherein the continuous process comprises dividing a total amount of the starter and/or starter precursor x continuously over n reactors or over n minus 1 reactors in a homogenous manner, wherein each of the n reactors is supplied with a continuous fraction of x/n mol of the starter.

3. The process according to claim 1, wherein the continuous process comprises feeding a largest amount of starter and/or starter precursor continuously into the first reactor of the reactor cascade while dividing evenly the remaining starter and/or starter precursor over the remaining reactors of the reactor cascade or over the remaining reactors but a last of the reactor cascade.

4. The process according to claim 1, wherein the continuous process comprises adding a certain amount of the starter and/or starter precursor to the first reactor while feeding all the rest of the starter and/or starter precursor into a last reactor of the reactor cascade.

5. The process according to claim 1, wherein the starter and/or starter precursor is provided in a solvent.

6. The process according to claim 1, comprising purifying a reaction mixture leaving a last reactor by distillation.

7. The process according to claim 6, comprising cooling a recycle stream leaving the distillation as a bottom residue prior to mixing it with a starter solution or a starter precursor solution.

8. The process according to claim 7, comprising cooling the recycle stream to temperatures <25° C.

9. The process according to claim 7, comprising cooling the starter solution and/or starter precursor solution while mixing it with the recycle stream.

10. The process according to claim 7, comprising cooling the starter solution and/or starter precursor solution in a first step, and then mixing it under further cooling at temperatures <50° C. with a pre-cooled recycle stream leaving the distillation as a bottom residue.

11. The process according to claim 1, wherein the alkane is methane and the alkanesulfonic acid is methanesulfonic acid, and wherein the process optionally comprises supplying methane to each reactor of the reactor cascade.

12. The process according to claim 1, comprising adjusting methane pressure reactor by reactor within a range of 10 to 200 bar.

13. The process according to claim 1, comprising feeding methane at the same pressure into first reactor(s) of the reactor cascade, and constantly operating a last reactor of the reactor cascade at a higher methane pressure than the first reactor(s) of the reactor cascade.

14. The process according to claim 1, wherein at least one reactor type comprised by the reactor cascade is a continuously stirred tank reactor.

15. The process according to claim 1, wherein at least one reactor type comprised by the reactor cascade is an air lift reactor, a loop reactor, a bubble column or a trickle bed reactor.

16. The process according to claim 1, comprising measuring conversion of SO3 and formation of methanesulfonic acid with density, and/or comprising measuring addition of water with a conductivity measurement and/or ultrasound measurements.

17. The process according to claim 1, comprising detecting side products by spectroscopic methods.

18. The process according to claim 1, comprising adjusting mass flow rate of a purge stream according to an amount of unconverted SO3 and an amount of sulfuric acid formed during synthesis of the starter.

19. The process according to claim 6, wherein a feed to the distillation has a methanesulfonic acid content of 50 to 99 wt. %, and/or a feed to the first reactor has a SO3 content of 30 to 100 wt. %.

20. The process according to claim 1, comprising achieving a high conversion of SO3 to alkane sulfonic acid and reducing an amount of waste.

21. The process according to claim 1, comprising dividing addition of the overall starter amount over several addition points in the process.

22. The process according to claim 5, wherein the solvent comprises sulfuric acid and/or alkanesulfonic acid.

23. The process according to claim 13, comprising constantly operating the last reactor of the reactor cascade at a higher methane pressure by up to 20 bar than the first reactor(s) of the reactor cascade.

24. The process according to claim 17, comprising detecting side products by RAMAN spectroscopy and/or NMR spectroscopy.

* * * * *